United States Patent [19]

Ishida et al.

[11] Patent Number: 4,678,232

[45] Date of Patent: Jul. 7, 1987

[54] HEADREST ASSEMBLY FOR VEHICLES

[75] Inventors: Keiichi Ishida; Takami Terada, both of Toyota, Japan

[73] Assignee: Aisen Seiki Kabushiki Kaisha, Japan

[21] Appl. No.: 721,912

[22] Filed: Apr. 11, 1985

[30] Foreign Application Priority Data

Apr. 13, 1984 [JP] Japan .............................. 59-55226[U]

[51] Int. Cl.[4] .............................................. A47C 1/10
[52] U.S. Cl. .................................... 297/408; 297/410; 297/391
[58] Field of Search ................ 297/408, 409, 410, 391

[56]     References Cited
        U.S. PATENT DOCUMENTS

| 736,844 | 8/1903 | Greer | 297/408 X |
|---|---|---|---|
| 3,547,486 | 12/1970 | Herzer et al. | 297/408 |
| 3,655,241 | 4/1972 | Herzer et al. | 297/408 |
| 3,692,356 | 9/1972 | Mertens | 297/408 |
| 4,099,779 | 7/1978 | Göldner | 297/408 |
| 4,191,423 | 3/1980 | Göldner | 297/408 |
| 4,256,341 | 3/1981 | Göldner et al. | 297/408 X |

FOREIGN PATENT DOCUMENTS

| 2720629 | 11/1978 | Fed. Rep. of Germany | 297/408 |
|---|---|---|---|
| 2945060 | 5/1981 | Fed. Rep. of Germany | 297/408 |
| 3021122 | 12/1981 | Fed. Rep. of Germany | 297/408 |
| 3200321 | 7/1983 | Fed. Rep. of Germany | 297/408 |
| 1065152 | 5/1954 | France | 297/408 |
| 110537 | 7/1982 | Japan | 297/408 |
| 887289 | 12/1981 | U.S.S.R. | 297/408 |

Primary Examiner—Peter A. Aschenbrenner
Assistant Examiner—Laurie K. Cranmer
Attorney, Agent, or Firm—Finnegan, Henderson, Farabow, Garrett & Dunner

[57]     ABSTRACT

An upwardly and downward adjustable headrest assembly for the seat backrest of a vehicle includes a fixed stay upstanding from the seat backrest, guide shoes slidable up and down along the stay and carrying a headrest body, and a locking mechanism disposed between one guide shoe and the stay for locking the guide shoe to the stay at any position therealong. The interior of the headrest provides the space needed to receive the stay as the headrest is moved up and down along the stay via the guide shoes, thereby allowing the headrest assembly to be installed on the backrest without increasing the thickness of the backrest.

5 Claims, 7 Drawing Figures

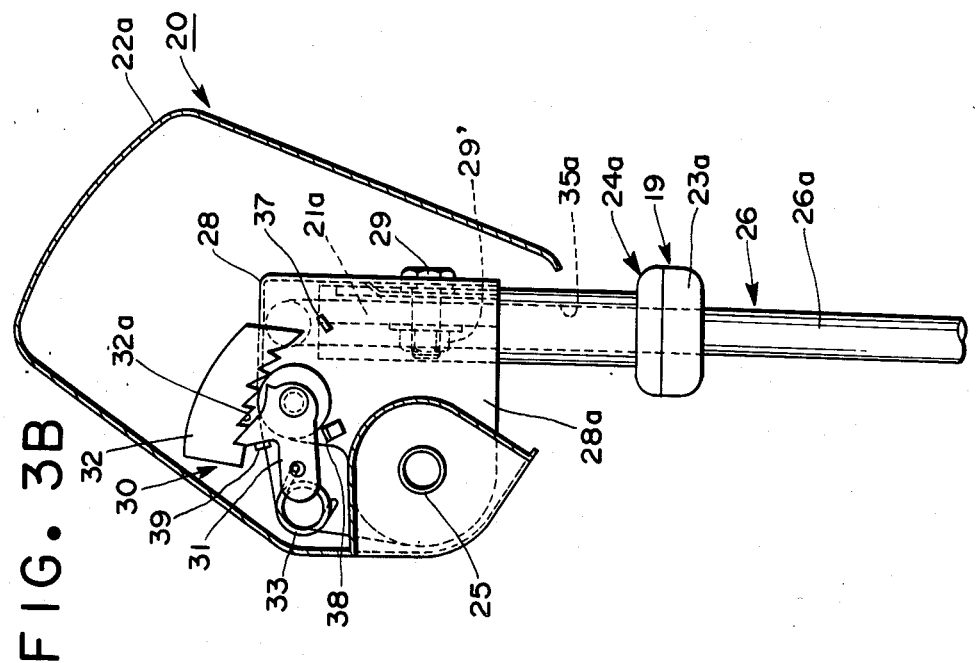
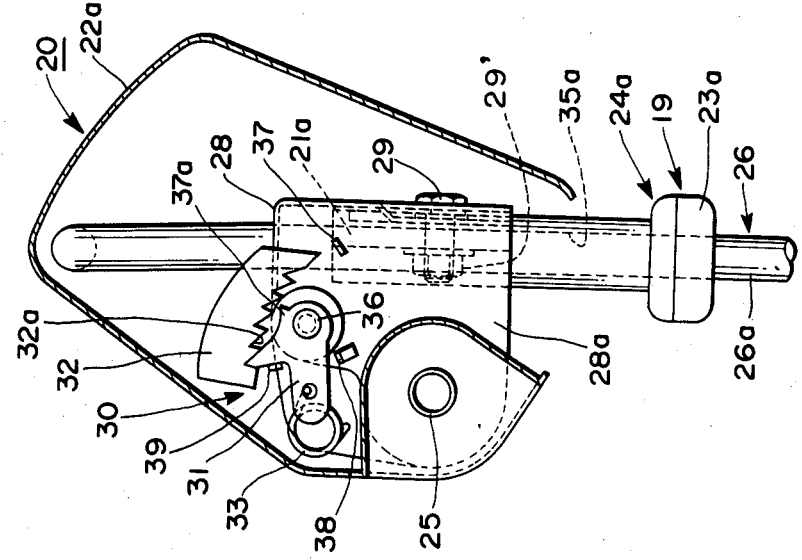

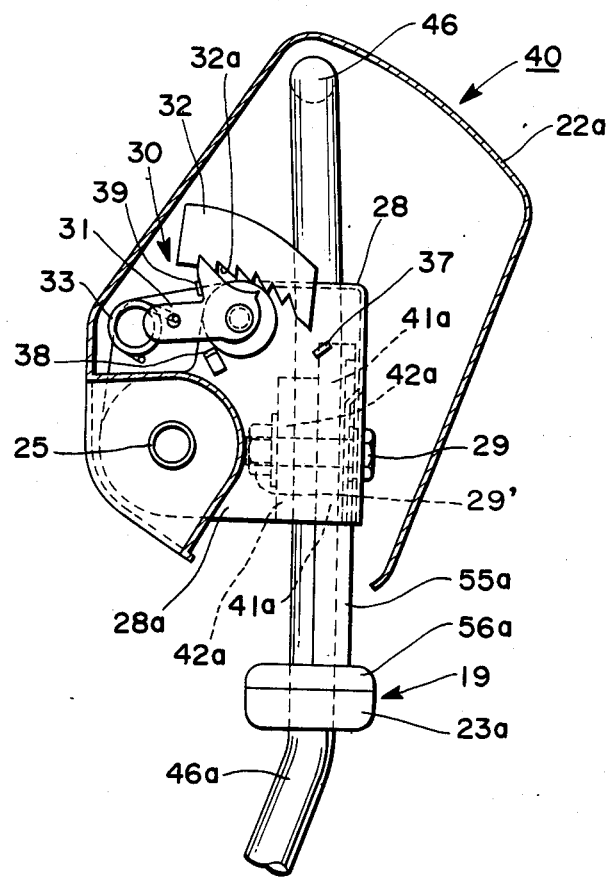

HEADREST ASSEMBLY FOR VEHICLES

BACKGROUND OF THE INVENTION

1. Field of the Invention

This invention relates to an upwardly and downwardly movable headrest assembly for vehicles, which headrest assembly is especially well-suited for application to the seat of an automobile. More particularly, the invention relates to a headrest assembly, of the type described, that makes possible a reduction in the front-to-back thickness of a backrest equipped with the headrest assembly.

2. Description of the Prior Art

A conventional headrest of the above-described type includes a stay slidably fitted into a guide channel provided in the backrest of a seat and extending generally longitudinally of the backrest. A locking mechanism is arranged between the backrest and the stay for locking the stay to the backrest once the headrest has been moved to a desired position. Thus, the prior-art arrangement requires that the guide channel be formed within the seatback. Since the seatback must also interiorly accommodate such items as a cushion and springs, extra space must be provided by increasing the front-to-back thickness of the seatback in order to furnish room for the guide channel. The need to provide a thick backrest is a disadvantage, especially in automobiles, in that this results in less legroom for passengers seated in the rear of the vehicle.

SUMMARY OF THE INVENTION

An object of the present invention is to provide an upwardly and downwardly adjustable headrest assembly for vehicles, which headrest assembly may be installed on a backrest of a vehicle seat without requiring an increase in the thickness of the backrest.

According to the present invention, the foregoing object is attained by providing an upwardly and downward adjustable headrest assembly for vehicles having a seat backrest, comprising a stay fixedly secured in an upstanding attitude to the seat backrest, a guide shoe fitted slidably on the stay and having a headrest body disposed thereon, and locking means disposed between the guide shoe and the stay for locking the guide shoe to the stay at any position longitudinally of the stay. The locking means includes a plurality of teeth formed in a longitudinally extending portion of the stay, a locking member arranged in the guide shoe for being engaged with the teeth, a spring for biasing the locking member into engagement with the teeth to lock the guise shoe to the stay, and a knob for forcing the locking member out of engagement with the teeth against the biasing force of the spring to permit the guide shoe to slide along the stay.

Since the guide shoe and, hence, the headrest slides up and down along the stay which upstands from the backrest rather than being received internally of the backrest, the interior of the headrest provides the space needed to receive the stay as the headrest is moved up and down. It is therefore unnecessary for the seatback to furnish a space for upward and downward movement of the stay. Consequently, the backrest can be equipped with the headrest assembly without any increase in its thickness.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3A is a side section taken along line III—III of FIG. 2;

FIG. 3B is a side section taken along the line III—III of FIG. 2 and illustrating the backrest assembly in a fully extended state;

FIG 5 is a side section taken along line V—V of FIG. 4; and

FURTHER DESCRIPTION OF THE PRIOR ART

Before describing preferred embodiments of the present invention, reference will be made to FIG. 1 to give a more detailed description of a conventional headrest to which the present invention appertains and of the shortcomings possessed by such a headrest.

Figure 1:
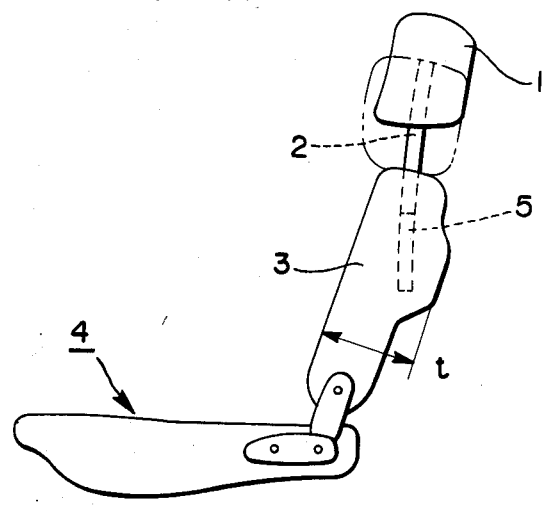
FIG. 1 is a side view illustrating a headrest according to the prior art as well as a seat backrest equipped with the headrest.

An upwardly and downwardly adjustable headrest according to the prior art ordinarily is of the configuration shown in FIG. 1. The headrest, designated at numeral 1, includes a stay 2 having an upper end to which the headrest 1 is secured. A backrest 3 of a vehicle seat 4 is provided with an internal guide channel 5 extending generally longitudinally of the backrest 3 for receiving the other or lower end of the stay 2. The stay 2 having the headrest 1 at its upper end is thus capable of sliding freely within the guide channel 5 so that the headrest 1 may be moved up or down as desired. A locking mechanism, not shown, is arranged between the backrest 3 and the stay 2 for fixing the stay 2 to the backrest 3 so that the headrest 1 may be locked at any desired position longitudinally of the backrest 3.

The backrest 3 internally accommodates items for passenger or driver comfort, such as springs, cushions and padding, not shown, as well as other components. In order to accommodate the guide channel 5 that receives the stay 2, therefore, additional space must be provided within the backrest 3, which as result takes on a considerable thickness t. The increased backrest thickness reduces the legroom available for a passenger in the rear seat and hence constitutes the shortcoming of the prior art.

The present invention contemplates elimination of this shortcoming encountered in the prior-art headrest.

DESCRIPTION OF THE PREFERRED EMBODIMENTS

Described hereinafter will be preferred embodiments of a headrest assembly according to the present invention.

Figure 2:
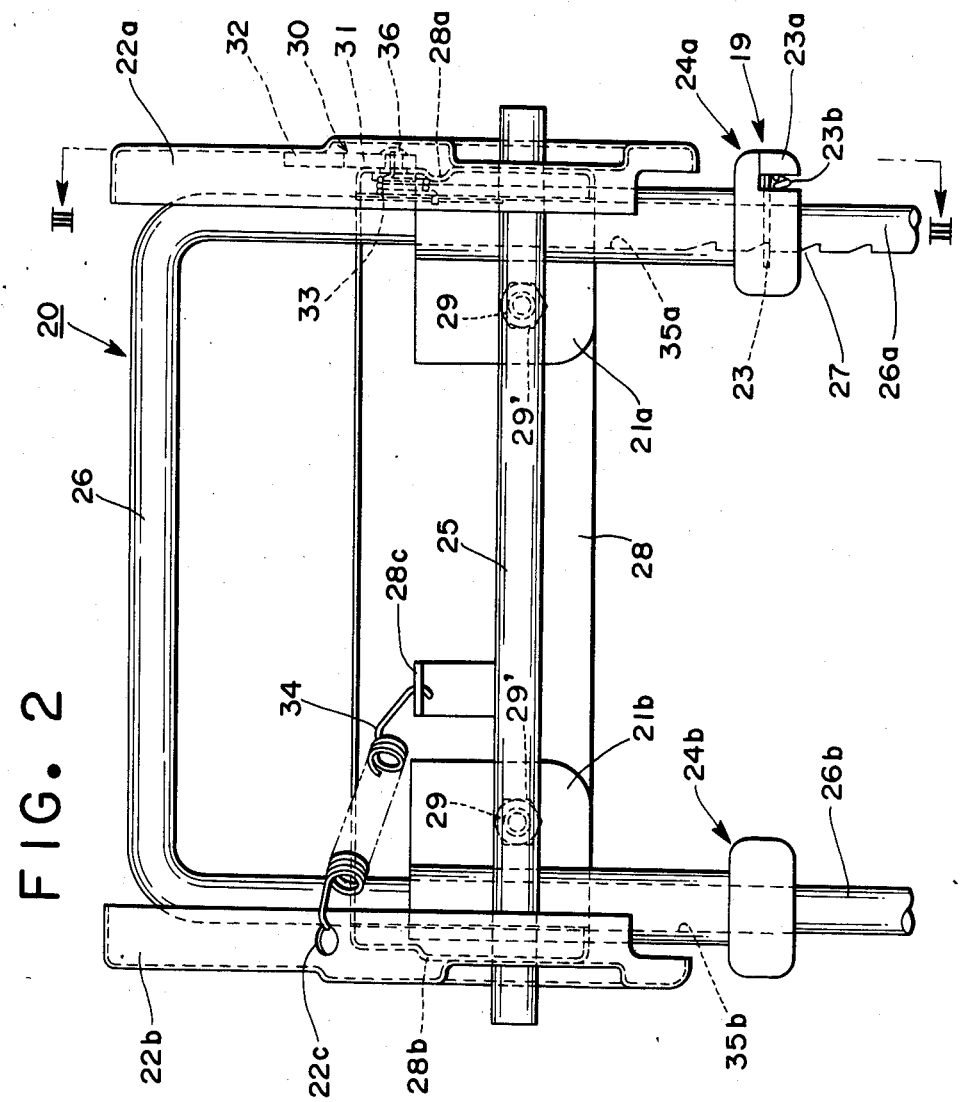
FIG. 2 is a front view illustrating an embodiment of a headrest assembly according to the present invention.

As shown in FIG. 2, the headrest assembly, designated generally at numeral 20, includes a generally U-shaped stay 26 having leg portions 26a, 26b fixedly secured to the frame of a seat backrest, neither of which are shown, in such a manner that the stay 26 upstands from the backrest, guide shoes 24a, 24b fitted slidably on the respective stay leg portions 26a, 26b, and a fixed bracket 28 disposed between the stay leg portions 26a, 26b and having the guide shoes 24a, 24b secured to the ends thereof in a manner described in further detail hereinbelow. The fixed bracket 28 is adapted to retain a rod 25 for free rotating motion, as will be set forth below. Mounted on opposite ends of the rod 25 are movable brackets 22a, 22b. A first locking mechanism 30 is arranged between the movable bracket 22a and the fixed bracket 28 for locking the former to the latter.

The guide shoes 24a, 24b are made of a synthetic resin material and are formed respectively to include bores 35a, 35b for receiving the stay leg portions 26a, 26b, respectively, passing therethrough. Extending toward each other laterally of the stay 26 are mounts 21a, 21b formed on the upper ends of the respective guide shoes 24a, 24b. As viewed in FIG. 6, the fixed bracket 28, which is disposed between the leg portions 26a, 26b of the stay 26, has its ends secured to the mounts 21a, 21b of the respective guide shoes 24a, 24b by bolts 29 and nuts 29'.

The fixed bracket 28 is provided at its ends with side plates 28a, 28b formed by bending the ends of the bracket 28 toward the front side of the headrest assembly 20, as best shown by the side plate 28a in FIG. 3A. The side plates 28a, 28b rotatably support the ends of the rod 25. Fixedly secured to the left and right ends of the rod 25, as depicted in FIG. 2, are the movable brackets 22a, 22b, respectively. The headrest body (not shown), against which the head of the seated individual actually rests, is attached to the movable brackets 22a, 22b. Since the rod 25 and, hence, the movable brackets 22a, 22b, is rotatably retained by the fixed bracket 28, the headrest body may be freely adjusted in position forwardly and backwardly relative to the backrest by being tilted about the rod 25. Further, since the guide shoes 24a, 24b are disposed on the respective legs 26a, 26b of the stay 26, the headrest body is capable of having its position freely adjusted up or down, that is, substantially longitudinally of the backrest, by sliding the guide shoes up or down along the legs 26a, 26b of the stay 26.

The headrest body is locked in position following its forward or backward adjustment relative to the backrest by means of the first locking mechanism 30. The first locking mechanism 30, best shown in FIG. 3A, includes a latch 32 fixedly provided on the movable bracket 22a, and a pawl 31 rotatably arranged on the fixed bracket 28. The latch 32 is formed to include a plurality of teeth 32a along an arc generally centered on the rod 25. The pawl 31 is supported for pivotal motion on the side plate 28a of the fixed bracket 28 by a pin 36 so as to be capable of having one end thereof brought into and out of engagement with each of the teeth 32a of the latch 32. A reversal spring 33 is connected between the other end of the pawl 31 and the side plate 28a and is adapted to hold the pawl 31 at a position where the pawl is in engagement with one of the teeth 32a of the latch 32, which is the state shown in FIG. 3A, or at a position where the pawl 31 is clear of the teeth 32a of the latch 32. The latch teeth 32a have a sawtooth-like configuration directed rearwardly of the seat backrest, each tooth 32a having a tooth surface extending generally longitudinally of the backrest for latching the end of the pawl 31 to prevent the movable bracket 22a and, hence, the headrest body, from being tilted rearwardly of the backrest. By virtue of the sawtooth shape of the latch teeth 32a, the pawl 31 oscillates counter-clockwise about the pin 36 when the movable bracket 22a is pushed forwardly of the backrest, with the result that the tip of the pawl 31 successively slides over the teeth 32a so that the forward-rearward position of the movable bracket 22a is changed. The movable bracket 22a is provided with a releasing member 37, and the pawl 31 has a projection 37a formed at a position at which the projection will be engaged by the releasing member 37 when the movable bracket 22a is tilted to its foremost position. By thus tilting the bracket 22a, the projection 37a of the pawl 31 is engaged by the releasing member 37 so that the pawl rotates in the clockwise direction about the pin 36. The reversal spring 33 now acts to disengage the pawl 31 from the latch 32. The fixed bracket 28 has a holding portion 38 so disposed as to hold the pawl 31 in the disengaged position.

A tension spring 34 has one end securely engaged with a hole 22c formed in the movable bracket 22b, and the opposite end securely engaged with a finger 28c formed on the fixed bracket 28. The tension spring 34 is thus stretched between the movable bracket 22b and the fixed bracket 28 for automatically tilting the movable bracket 22b, and hence the movable bracket 22a, rearwardly of the backrest. The movable bracket 22a is further provided with an engagement member 39. When the movable bracket 22a is at its rearmost position, which is the state shown in FIG. 3A, the pawl 31 is engaged by the member 39 and rotates counter-clockwise about the pin 36. As a result, the reversal spring 33 acts to re-engage the pawl 31 with the latch 32.

The headrest assembly 20 further includes a second locking mechanism 19 for locking the headrest body into position longitudinally of the backrest, that is, after the headrest has been adjusted up or down to the desired position. The second locking mechanism 19 comprises a plurality of teeth 27 formed in the leg portion 26a of the stay 26 and extending longitudinally of the leg portion, and a locking member 23 arranged in the guide shoe 24a. The teeth 27 have a sawtooth shape directed upwardly of the leg portion 26a, each tooth having a generally horizontal surface with which the locking member 23 is capable of being engaged to lock the guide shoe 24a to the leg portion 26a. The locking member 23 is accommodated by the guide shoe 24a so as to be slidable freely in the horizontal direction and has a knob portion 23a which, by being pushed leftwardly in FIG. 2 against the force of a spring 23b compressed between the knob 23 and the guide shoe 24a, disengages the locking member 23 from the teeth 27. This frees the guide shoe 24a from the leg portion 26a of the stay 26 and thus enables the headrest body to be moved to a new position, either up or down, by sliding the guide shoes 24a, 24b along the respective leg portions 26a, 26b. Though the locking member 23 is biased to the right in FIG. 2 at all times by the spring 23b, pushing the headrest body, and, hence, the guide shoes 24a, 24b, upwardly will cause the locking member 23 to slide over the teeth 27, thereby enabling the vertical position of the headrest body to be changed.

When the headrest body is at its uppermost position, as shown in FIG. 3B, the upper end of the stay 26 is situated close to the center of the movable bracket 22a. When the headrest body is moved downwardly to its lowermost position, as shown in FIG. 3A, the upper end of the stay 26 comes to a occupy a position close to the upper end of the movable bracket 22a. In other words, the guide shoes 24a, 24b slidable on the respective leg portions 26a, 26b of the stay 26 are accommodated within the headrest body, which is not shown, and therefore need not be installed inside the backrest of the vehicle seat.

Figure 6:
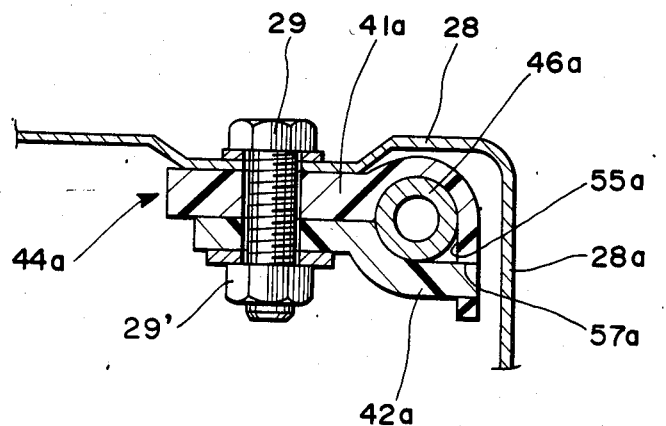
FIG. 6 is a partial sectional view taken along line VI—VI of FIG. 4.
Figure 4:
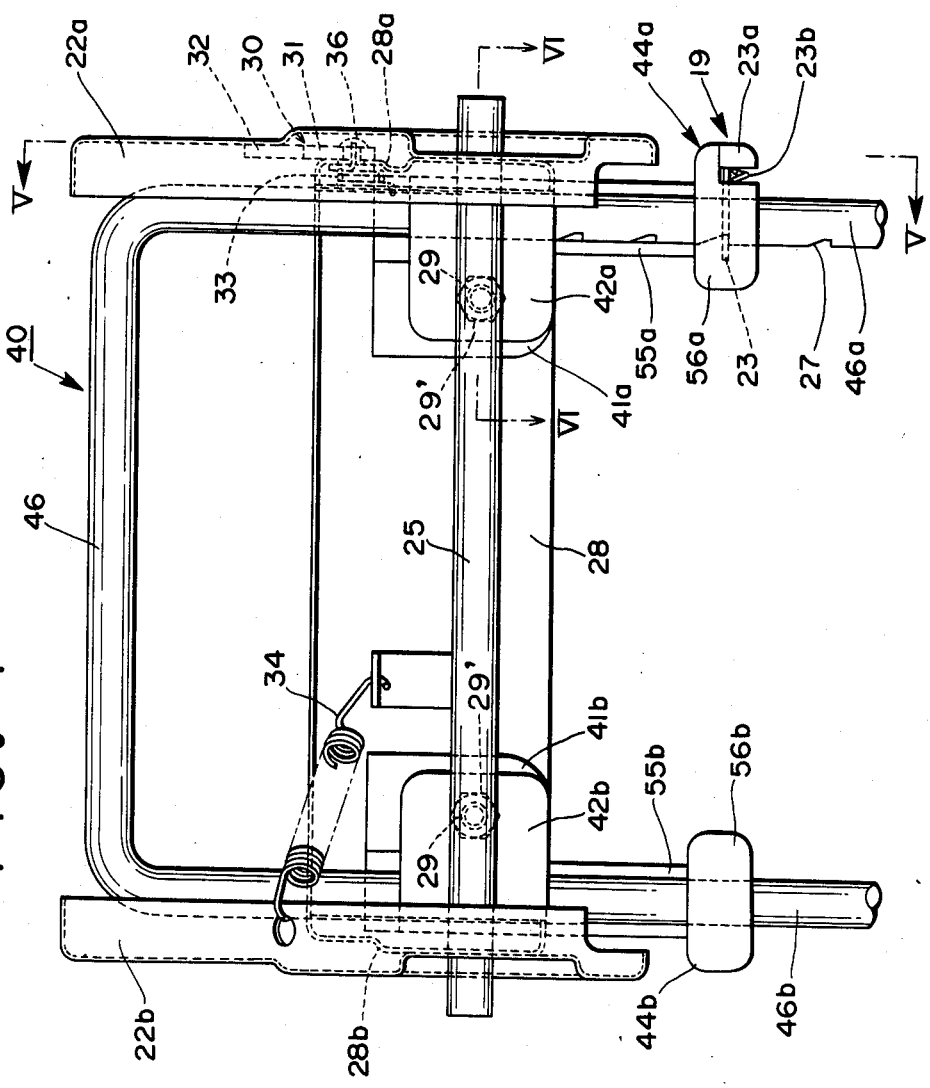
FIG. 4 is a front view illustrating another embodiment of a headrest assembly according to the present invention.

FIGS. 4, 5 and 6 illustrate a second embodiment of the present invention, in which portions similar to those of the first embodiment are designated by like reference characters. Here the stay, designated at numeral 46, includes leg portions 46a, 46b having a bend, as shown in FIG. 5, that is sometimes necessary for attaching the stay 46 to the seat backrest. With such a configuration it is difficult to set guide shoes 44a, 44b to prescribed positions on the stay 46 by fitting the guide shoes 44a, 44b over the ends of the respective leg portions 46a, 46b. Therefore, according to this embodiment of the present invention, the guide shoes 44a, 44b are composed of fittings 56a, 56b each of which has a hole through which the ends of the respective leg portions 46a, 46b are passed, and flexible support members 55a, 55b each of which has a longitudinally extending recess for receiving the leg portions 46a, 46b, respectively. This arrangement enables the guide shoes 44a, 44b to be fitted on the stay 46 even if its legs 46a, 46b are bent. As shown in the sectional view of FIG. 6, the guide shoes 44a, 44b have respective retaining plates 42a, 42b arranged forwardly of their upper ends. The retaining plates 42a, 42b, which are made of a synthetic resin material, are securely fastened to the respective guide shoes 44a, 44b by tightening the bolts 29 when mounts 41a, 41b of the guide shoes 44a, 44b are attached to the fixed bracket 28. Each of the retaining plates 42a, 42b has its distal end engaged with a groove 57a formed in the corresponding guide shoe 44a or 44b. The guide shoes 44a, 44b may thus be slidably fitted on the leg portions 46a, 46b of the stay 46 at both the upper and lower ends thereof. Accordingly, the guide shoes 44a, 44b will not wobble or rock back and forth on the stay 46 even if a large load acts upon the headrest body.

As many apparently widely different embodiments of the present invention can be made without departing from the spirit and scope thereof, it is to be understood that the invention is not limited to the specific embodiments thereof except as defined in the appended claims.

What we claim is:

1. A headrest assembly for vehicles having a seat backrest, comprising:
   a headrest;
   a stay fixedly secured to the seat backrest and having a pair of leg portions;
   guide shoe means slidably mounted on each of said leg portions for slidably supporting said headrest relative to said stay, said guide shoe means including a pair of guide shoes;
   a fixed bracket extending between said leg portions and secured to said guide shoe means for sliding relative to said stay with said guide shoes;
   a rod rotatably mounted on said fixed bracket;
   movable bracket means mounted at opposite ends of said rod for pivotally supporting said headrest;
   first locking means connecting said movable bracket means and said fixed bracket for adjusting the position of said movable bracket means relative to said fixed bracket, thereby preventing pivotal movement of said headrest when locked, said first locking means including:
   engagement means fixedly secured to said movable bracket means and including a latch having a first series of teeth centered on said rod;
   a pawl means rotatably mounted on said fixed bracket for engagement with said latch; and
   reversal spring means connecting said pawl means and said fixed bracket means for biasing said pawl means into engagement with or disengagement with said latch; and
   second locking means adapted to be mounted on at least one of said guide shoes to engage a corresponding one of said leg portions for regulating the position of said guide shoes relative to said leg portions when raising and lowering said headrest.

2. The headrest assembly as defined in claim 1, wherein said first locking means includes
   a releasing member and a holding portion, said releasing member positioned on said movable bracket means to engage said pawl means when said movable bracket means is pivoted to a forwardmost position relative to the backrest, thereby disengaging said pawl means from said latch, said holding portion being mounted on said fixed bracket to restrict the rotation of said pawl means in response to said reversal spring means when disengaged from said latch.

3. The headrest assembly as defined in claim 1, wherein said second locking means includes a series of second teeth extending along at least one of said leg portions and a locking member attached to at least one of said guide shoes for engagement with said series of second teeth.

4. The headrest assembly as defined in claim 3, wherein said second locking means also includes:
   spring means for biasing said locking member into engagement with said series of second teeth; and
   actuating means for forcing said locking member out of engagement with said series of second teeth against the biasing force of said spring means.

5. A headrest assembly for vehicles having a seat backrest, comprising:
   a headrest frame;
   a stay fixedly secured to the seat backrest and having a pair of leg portions;
   guide shoe means slidably mounted on each of said leg portions for slideably positioning the headrest frame relative to said stay;
   a fixed bracket extending between said leg portions and secured to said guide shoe means for sliding relative to said stay with said guide shoe means;
   a rod rotatably mounted on said fixed bracket;
   movable bracket means mounted at opposite ends of said rod for pivotally supporting said headrest;
   first locking means connecting said movable bracket means and said fixed bracket for adjusting the position of said movable bracket means relative to said fixed bracket, thereby preventing pivotal movement of said headrest when locked, said first locking means including:
   engagement means fixedly secured to said movable bracket means and including a latch having a series of teeth centered on said rod;
   pawl means rotatably mounted on said fixed bracket for engagement with said latch; and
   reversal spring means disposed between said pawl means and said fixed bracket means for biasing said pawl means into engagement with or disengagement with said latch; and
   second locking means adapted to be mounted on at least one of said guide shoes to engage a corresponding one of said leg portions for regulating the position of said guide shoes relative to said leg portions when raising and lowering said headrest;

said guide shoe means on each of said leg portions including a fitting having a bore extending therethrough for receiving a corresponding one of said leg portions to enable said fitting to be slidably positioned along said stay, said guide shoe means also including a support member secured between said fitting and said fixed bracket along each of said leg portions, each of said support members having a longitudinally extending recess aligned with said bore to receive respective ones of said leg portions.

* * * * *

UNITED STATES PATENT AND TRADEMARK OFFICE
CERTIFICATE OF CORRECTION

PATENT NO. : 4,678,232

DATED : July 7, 1987

INVENTOR(S) : Keiichi Ishida; Takami Terada, both of Tokyo, Japan

It is certified that error appears in the above-identified patent and that said Letters Patent is hereby corrected as shown below:

ON THE TITLE PAGE:

Delete "[73] Assignee: Aisen Seiki Kabushiki Kaisha

Insert --[73] Assignee: Aisin Seiki Kabushiki Kaisha --

Signed and Sealed this

Twenty-second Day of December, 1987

*Attest:*

DONALD J. QUIGG

*Attesting Officer*     *Commissioner of Patents and Trademarks*